June 2, 1970  J. M. NIEMEYER ET AL  3,515,842
BOND TESTING APPARATUS
Filed Aug. 1, 1966
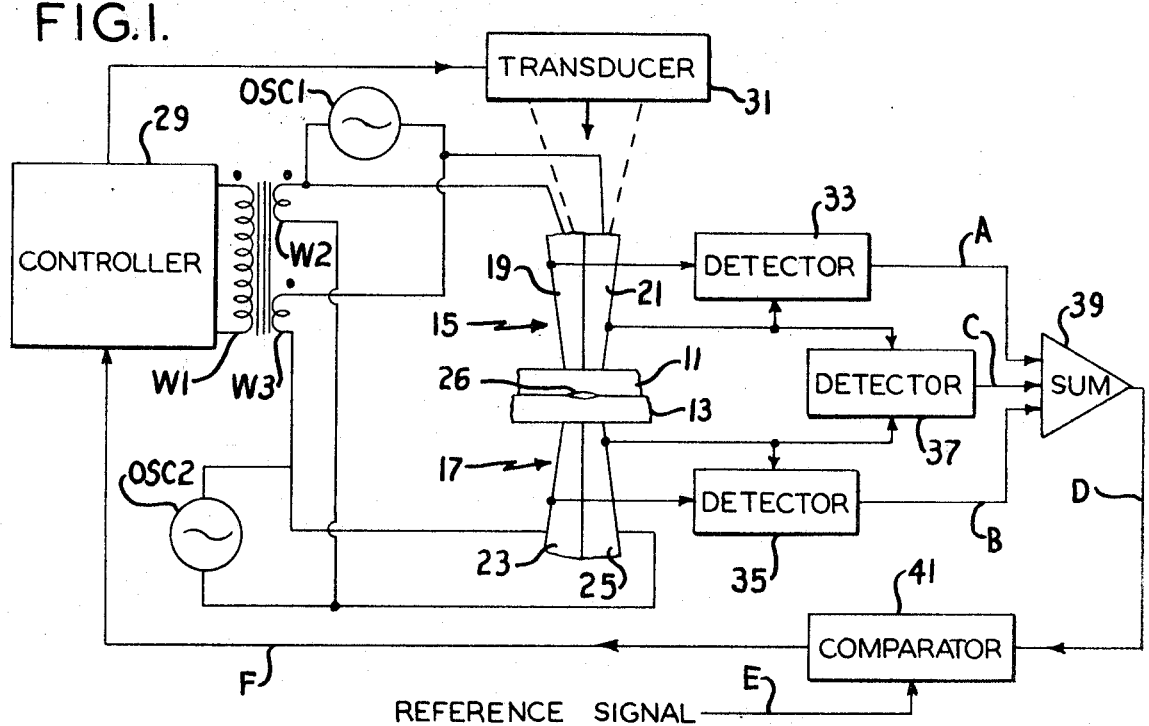
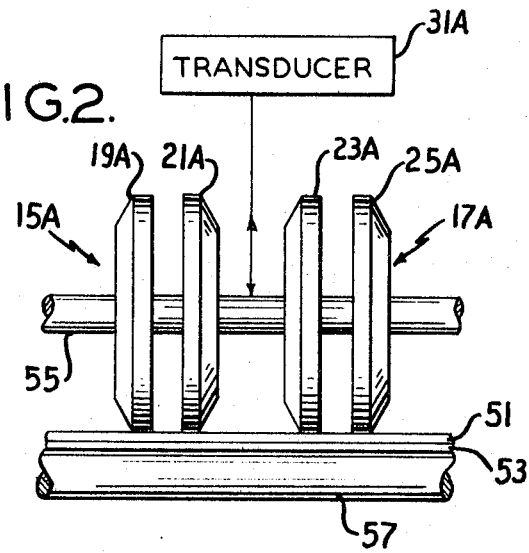
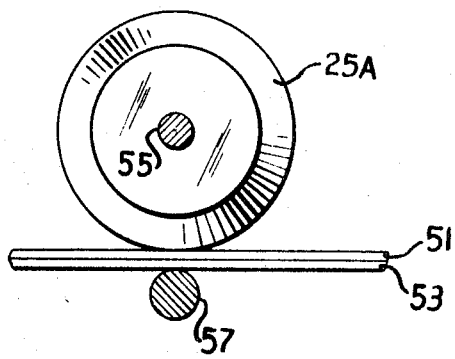
James M. Niemeyer,
John D. Helms,
Inventors.
Koenig, Senniger, Powers and Leavitt,
Attorneys.

United States Patent Office 3,515,842
Patented June 2, 1970

3,515,842
BOND TESTING APPARATUS
James M. Niemeyer, Richardson, and John D. Helms,
Dallas, Tex., assignors to Texas Instruments Incorporated, Dallas, Tex., a corporation of Delaware
Filed Aug. 1, 1966, Ser. No. 569,385
Int. Cl. B23k 11/24
U.S. Cl. 219—109                                    11 Claims

ABSTRACT OF THE DISCLOSURE

A weld testing apparatus consisting of at least one electrode adapted to engage one of the workpieces to be welded, the electrode having at least two current carrying members which are insulated from each other. A voltage is applied between the two current carrying members for developing a component signal which varies as a function of the pressure between the electrode and the workpiece with which it is in contact. Means are provided for passing a biasing current through the electrode and both the workpieces in order to cyclically vary the pressure exerted on the workpieces by the electrode to generate a composite signal at the electrode, the amplitude of which varies as a function of the resistance between the electrode and the workpiece with which it is in contact and also as a function of the character of the bond between the workpieces. Circuit means are provided for combining the component signal and the composite signal to provide a signal which varies as a function of the character of the weld independently of the resistance between the electrode and the workpiece with which it is in contact. This combined signal can then be compared to a reference signal in order to determine the character of the weld being made.

---

The present invention relates to bond testing apparatus and more particularly to apparatus for making and testing a weld bond between a pair of workpieces.

In the making of welded connections in miniature electronic circuitry, the parameters which affect or determine the quality of the weld produced may vary over a considerable range and it is therefore desirable that each weld made be tested for quality either during the welding process itself or immediately subsequent thereto so that corrective action may be taken if any defective welds occur.

It has previously been proposed to test the quality of a weld joint by measuring the dynamic resistance of the joint. In this measurement process, a biasing current is passed through the weld joint and the joint is subjected to a cyclically varying pressure. If the joint is defective so that it exhibits a relatively high resistance under low pressure, the cyclically varying pressure will cause an A.C. signal to be developed across the weld, the amplitude of which varies as a function of the quality of the weld. Various methods of developing such a signal are shown in United States Letters Patent 3,192,474 issued to Lloyd B. Cherry on June 29, 1965. In each of these known methods test contacts are made to the workpieces separately from the electrodes which make the weld.

However, in testing weld joints by this general method, it is advantageous if the test connections to the workpieces and the application of the cyclically varying pressure are made through the welding electrodes themselves. In this way the need to shift the position of the workpieces or to establish separate contacts may be avoided. However, if the biasing current is applied through the welding or pressure varying contact, the test signal which is developed will then include an error component caused by cyclical variations in the contact resistance between the electrodes and the respective workpieces with which they are in contact. It is therefore desirable that some means be provided for eliminating or compensating for this error component of the test signal.

Other forms of bonding may also be tested by varying the pressure across the bond and measuring the bond resistance variations caused by the pressure variations. In such testing also it is desirable to eliminate or compensate for any variations in the contact resistance of the electrode making the test measurement, particularly if these same electrodes are employed in applying the variable pressure on the bond.

Among the several objects of the present invention may be noted the provision of novel apparatus for testing the quality of a bond, such as a weld joint, between a pair of workpieces; the provision of such apparatus wherein test connections to the workpieces are established through welding electrodes which make a welded bond; the provision of such apparatus in which a test signal is developed across the weld bond by a cyclically varying pressure exerted on the weld bond; the provision of such apparatus in which signal components due to variations in the resistance between the welding electrodes and the workpieces with which they are in contact are compensated for; the provision of such apparatus which provides a signal which may be utilized to initiate an automatic correction of a defective weld between a pair of workpieces; the provision of such apparatus which is highly reliable; and the provision of such apparatus which is relatively simple and inexpensive. Other objects and features will be in part apparent and in part pointed out hereinafter.

Briefly, apparatus according to this invention is operative for testing a bond between a pair of workpieces. The apparatus includes at least one electrode for engaging one of said workpieces and the electrode comprises at least two current carrying members which are insulated from each other. A voltage is applied between the two current carrying electrode members for developing a component signal which varies as a function of the pressure between the electrode and the workpiece with which it is in contact. Means are also provided for passing a biasing current through the electrode and both of the workpieces and for cyclically varying the pressure exerted on the workpieces by the electrode thereby to generate a composite A.C. signal at the electrode, the amplitude of which varies as a function of the resistance between the electrode and the workpiece with which it is in contact and also as a function of the character of the bond between the workpieces. Circuit means are provided combining the component signal and the composite signal to provide a signal which varies as a function of the character of said weld substantially independently of the resistance between the electrode and the workpiece with which it is in contact.

The invention accordingly comprises the constructions hereinafter described, the scope of the invention being indicated in the following claims.

In the accompanying drawings, in which several of various possible embodiments of the invention are illustrated.

FIG. 1 is a block diagram of apparatus of this invention for making and testing a welding joint between a pair of workpieces;

FIG. 2 is a front view of a roller electrode assembly for testing the bond between bonded metal sheets; and FIG. 3 is a view substantially on the line 3—3 of FIGURE 2.

Corresponding reference characters indicate corresponding parts throughout the several views of the drawings.

Referring now to FIG. 1, there are indicated at 11 and 13 workpieces which are to be welded together. Workpieces 11 and 13 may, for example, be constituted by the leads of miniature electronic components and circuits and may comprise relatively thin metal films. Opposed electrode assemblies 15 and 17 engage respective ones of the workpieces 11 and 13 and clamp them together. Electrode assembly 15 comprises two current carrying members 19 and 21 which are closely adjacent to but insulated from each other. Electrode assembly 17 similarly comprises a pair of current carrying members 23 and 25 which are also insulated from each other. In some types of welding, a single electrode may be used with a conductive base or one of the workpieces itself functioning as the sink or drain for welding current applied through the electrode.

Electric current for welding workpieces 11 and 13 together is provided by a controller as indicated generally at 29. Controller 29 may, for example, be generally of the type disclosed in copending, coassigned application Ser. No. 303,211, filed Aug. 14, 1963. Controller 29 is operative to apply a measured pulse of current to the primary winding W1 of a transformer T1.

Transformer T1 includes a pair of secondary windings W2 and W3. Each of the secondary windings W2 and W3 is connected across two of the electrode current carrying members which are on opposite sides of the workpieces. One end of winding W2 is connected to member 19 and the other end to member 25. Similarly, one end of winding W3 is connected to member 21 and the other end is connected to member 23. As may be seen from the conventional dot notation employed in the drawing, the ends of the windings W2 and W3 having the same instantaneous polarity are connected to current carrying members on the same side of the workpieces. Thus, it can be seen that windings W2 and W3 are connected for applying parallel currents through the workpieces which will aid in heating the material of the workpieces to produce a weld between them as indicated at 26.

Connected across the two current carrying members 19 and 21 which constitute electrode assembly 15 is a source of A.C. at a relatively high frequency, herein illustrated as an oscillator OSC1. At the relatively high frequency provided by oscillator OSC1, the inductance of winding W2 constitutes a relatively high impedance and therefore winding W2 does not appreciably load oscillator OSC1. A significant A.C. signal is thus developed between the current carrying members 19 and 21. The amplitude of this A.C. signal is variable as a function of the resistances between members 19 and 21 and the workpieces 11 with which they are in contact and hence also a function of the force exerted by the electrode assembly on the workpiece. A similar oscillator OSC2 is connected across the current carrying members 23 and 25 which comprise the electrode assembly 17 for providing a signal which varies with the resistance between those members and the respective workpiece 13 with which they are in engagement.

Oscillators OSC1 and OSC2 are synchronized and phased in relation to their connections with windings W2 and W3 so that a voltage component is also developed across the two electrode assemblies through the workpieces and any weld between the workpieces. Thus a biasing current is passed through the weld for producing a voltage across the weld which varies with pressure as taught in the aforesaid patent to L. B. Cherry.

A cyclically varying pressure is exerted on the workpieces through electrodes 15 and 17 by means of a vibrator or transducer 31 which is selectively energized by controller 29.

A first detector 33 is connected across the current carrying members 19 and 21 for sensing the voltage developed therebetween by oscillator OSC1. As noted previously, this voltage will vary with the contact pressure and resistance between each of the current carrying members 19 and 21 and the workpiece 11. Detector 33 provides an output signal, indicated at A, which varies as a function of these resistances. A similar detector 35 is connected across the current carrying members 23 and 25 for providing a signal, indicated at B, which varies as a function of the resistances between these current carrying members and the respective workpiece 13.

A third detector 37 is connected across the current carrying members 21 and 25 and thus spans not only the contacts of these current carrying members with the respective workpieces but also the junction or weld between the two workpieces. Thus, assuming a biasing current is flowing between the two electrode assemblies through the workpieces and any weld between them, detector 37 provides a signal, as indicated at C, which varies not only as a function of the resistances between the electrodes and the respective workpieces but also as a function of the character or quality of the weld connection between the workpieces.

The three signals A, B and C are combined or summed with appropriate weighting in a mixing circuit or network as indicated at 39 to provide a signal, as indicated at D, which varies as a function of the character of the weld between workpieces 11 and 13, independently of variations in the contact resistance between the various electrodes and the respective workpieces. In other words, the signals (A and B) representing the variations in electrode contact resistances are substracted from the signal (C) which represents a mixture of the variations in electrode contact resistances and weld resistance to yield a signal (D) which represents weld quality alone.

A reference signal, provided as indicated at E, represents the quality or character of a satisfactory weld between a pair of workpieces such as 11 and 13. Signals D and E are compared against each other in a comparator circuit as indicated at 41 to determine whether or not the character of the weld between workpieces 11 and 13 as represented by signal D is satisfactory or not. If the weld between workpieces 11 and 13 is not satisfactory, an error signal, as indicated at F, is provided to controller 27 to initiate another welding cycle so that the character of the weld is brought to a satisfactory level for the purpose intended.

Instead of being employed to automatically initiate recycling of the welding controller 29, the signal D which represents the quality of the weld may be measured and displayed as described in the aforementioned patent to L. B. Cherry so that corrective steps may be taken by the operator of the welding apparatus.

It has also been found that the dynamic resistance characteristics of the weld connection vary during the welding process itself. In this case, the welding current itself may serve to bias the weld connection for generating a signal which varies in response to changes in pressure, the amplitude of the variations being representative of the character of the weld being formed. Accordingly, the signal D, as developed during the welding cycle itself, may be employed as a feedback signal to control the amount of energy applied to the weld so that the welding cycle is automatically terminated when a satisfactory weld is achieved and before burning of the workpieces is produced. With feedback control of this type, the welding apparatus may then accommodate a wide range of different sizes and types of workpiece materials without major readjustments, the quality of the weld being controlled in each case by the feedback control.

Apparatus according to this invention is also useful for determining or testing the quality of solid-phase bond between the different layers of a laminated metal sheet, e.g., one in which layers of two different metals have been solid-phase bonded to one another. In FIGS. 2 and 3 there is illustrated a pair of roller electrode assemblies indicated generally at 15A and 17A which may be employed to test the quality of the bond between a pair of metal sheets or films 51 and 53 on a continuous basis. Electrode assembly 15A comprises a pair of roller wheels 19A and 21A which are insulated from each other and are mounted on a common shaft 55, separate electrical connections to the rollers being brought out through the shaft. Electrode assembly 17A similarly comprises a pair of roller wheels 23A and 25A which are also mounted on shaft 55 and provided with independent connections. Roller wheels 19A, 21A, 23A and 25A bear against the upper one (51) of the laminated metal sheets 51 and 53, the sheets being backed by a pressure roll as indicated at 57. A transducer 31A provides an oscillatory force on shaft 55 for varying the pressure exerted on sheets 51 and 53 by the roller wheels.

By passing a biasing current from electrode assembly 15A through the laminated metal sheets 51 and 53 while the force applied by the roller wheels is being varied in an oscillatory manner, an A.C. signal may be obtained which varies as a function both of the contact resistances between the roller wheels and the metal sheet 51 and also as a function of the bond between the sheets 51 and 53. By applying a voltage between the two wheels in each of the electrode assemblies 15A and 17A component signals may also be obtained which vary substantially as a function of the resistance between those wheels and the metal sheet 51. By combining the component signals with the signal developed between the two different electrode assemblies (15A and 17A) in the manner described previously with reference to FIG. 1, a signal is obtained which varies as a function of the character of the bond between sheets 51 and 53 substantially independently of the resistances between the electrode wheels and the sheet 51. This signal is then useful as a quality check and in maintaining manufacturing parameters so as to maintain the production of a satisfactory bond between the sheets.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. Apparatus for testing a bond between a pair of workpieces, said apparatus comprising:
   an electrode for engaging one of said workpieces, said electrode comprising at least two current carrying members which are insulated from each other;
   means for applying a voltage between said two current carrying electrode members for developing a component signal which varies as a function of the pressure between the electrode and the workpiece with which it is in contact;
   means for passing a biasing current through said electrode and both of said workpieces and cyclically varying the pressure exerted on the workpieces by said electrode thereby to generate a composite A.C. signal at said electrode, the amplitude of which varies as a function of the resistance between said electrode and the workpiece with which it is in contact and also as a function of the character of the bond between the workpieces; and
   circuit means for combining said component signal and said composite signal to provide a signal which varies as a function of the character of said bond and which is substantially independent of the resistance between the electrode and the workpiece with which it is in contact, said signal resulting from the combination of said component signal and said composite signal being adapted for comparison with a reference signal related to the character of said bond whereby a bond of high quality is maintained.

2. Apparatus as set forth in claim 1 wherein said electrode is a welding electrode and the apparatus further comprises means for passing a current through said electrode and said workpieces to form a weld between the workpieces.

3. Apparatus as set forth in claim 1 wherein said current carrying members comprise roller wheels for engaging one of said workpieces.

4. Apparatus for making and testing a weld joint between a pair of workpieces, said apparatus comprising:
   a welding electrode for engaging one of said workpieces, said electrode comprising at least two current carrying members which are insulated from each other;
   means for passing a current through said electrode and said workpieces to form a weld between the workpieces;
   means for applying a voltage between said two current carrying electrode members for developing a component signal which varies as a function of the pressure between the electrode and the workpiece with which it is in contact;
   means for cyclically varying the pressure exerted on the workpieces by said electrode while a biasing current flows through said electrode and the weld between said workpieces thereby to generate a composite A.C. signal at said electrode, the amplitude of which varies as a function of the resistance between said electrode and the workpiece with which it is in contact and also as a function of the character of the weld between the workpieces; and
   circuit means for combining said component signal and said composite signal to provide a signal which varies as a function of the character of said weld and which is substantially independent of the resistance between the electrode and the workpiece with which it is in contact, said signal resulting from the combination of said component signal and said composite signal being adapted for comparison with a reference signal related to the character of said bond whereby a bond of high quality is continuously formed on said workpieces.

5. Apparatus as set forth in claim 4 wherein said means for applying a voltage between said two current carrying members comprises an oscillator.

6. Apparatus as set forth in claim 5 including means for detecting variations in the A.C. signal produced between said current carrying members by said oscillator.

7. Apparatus as set forth in claim 4 including a second welding electrode for engaging one of said workpieces, said second electrode being similar to the first said electrode and comprising at least two current carrying members which are insulated from each other, said apparatus including also means for applying a voltage between said two current carrying second electrode members for developing a second component signal which varies as a function of the pressure between said second electrode and the workpiece with which it is in contact, said circuit means being operative to combine the two said component signals and said composite signal to provide a signal which varies as a function of the character of the weld substantially independently of the resistances between said electrodes and the workpieces with which they are in contact.

8. Apparatus as set forth in claim 7 wherein said electrodes are opposed to one another for clamping workpieces therebetween.

9. Apparatus as set forth in claim 7 wherein each means for applying a voltage between the respective electrode current carrying members comprises an oscillator, the A.C. voltages being applied by said oscillators to the respective electrodes being synchronized.

10. Apparatus as set forth in claim 4 including means for detecting variations in the amplitude of the A.C. signal generated at said electrode by said cyclically varying pressure.

11. Apparatus as set forth in claim 4 including means for comparing the signal which varies as a function of the character of said weld independently of the resistance between said electrode and the workpiece with which it is in contact with a signal having a preselected amplitude which represents the character of a satisfactory weld.

References Cited

UNITED STATES PATENTS

| 2,848,595 | 8/1958 | Van Sciver | 219—108 |
| 3,192,474 | 6/1965 | Cherry | 219—109 |

JOSEPH V. TRUHE, Primary Examiner

T. G. SMITH, Assistant Examiner